United States Patent [19]

Lee

[11] 3,720,868

[45] March 13, 1973

[54] MULTIPLE INPUT VOLTAGE SOURCE POWER SUPPLY

[75] Inventor: Clarence M. Lee, Evanston, Ill.

[73] Assignee: Zenith Radio Corporation, Chicago, Ill.

[22] Filed: Jan. 10, 1972

[21] Appl. No.: 216,519

[52] U.S. Cl. .................................. 321/47, 307/146
[51] Int. Cl. ................................................ H02m 7/20
[58] Field of Search ...... 307/66, 75, 146; 321/15, 43, 321/47, 8, 18

[56] References Cited

UNITED STATES PATENTS

| | | | |
|---|---|---|---|
| 3,156,860 | 11/1964 | Paynter | 321/47 X |
| 3,356,928 | 12/1967 | Parrish | 321/18 |
| 3,454,865 | 7/1969 | Ellert | 323/22 SC |

Primary Examiner—William M. Shoop, Jr.
Attorney—Nicholas A. Camasto et al.

[57] ABSTRACT

A power supply for supplying a predetermined d.c. output voltage notwithstanding its connection to external a.c. voltage sources of different voltage magnitudes operates in either a full wave rectifying or diode ridge rectifying mode to accommodate the different source voltage. A zener diode senses the source voltage magnitude and a mode control voltage controls a switching circuit for establishing the power supply in the proper rectifying mode.

7 Claims, 2 Drawing Figures

MULTIPLE INPUT VOLTAGE SOURCE POWER SUPPLY

BACKGROUND OF THE INVENTION

The present invention relates generally to an a.c. to d.c. voltage power supply and more particularly to an a.c. to d.c. power supply which operates in a multiplicity of modes to provide a predetermined output voltage notwithstanding its connection to a.c. external voltage sources of first or second voltage magnitudes.

The task of providing a predetermined output voltage to power electronic equipment is difficult if the electronic equipment is operated in different countries where the magnitude of the a.c. line voltage varies substantially from country to country. Take for example a power supply which is designed to operate within the United States to provide a predetermined output voltage for an a.c. input supply voltage of 115 volts. If the same supply were connected to a source of 230 volts a.c. as commonly encountered in European countries, the output of the supply would unfortunately be twice that supplied at 115 volts if the components of the supply were not damaged in the process.

One solution to this problem has been to provide a switch for switching taps on a power supply transformer to accommodate various input voltages. In practicing this solution however, it is possible that serious damage may result to the components of the electronic equipment incorporating such a supply if the proper taps on the transformer are not switched into the power supply circuit at the time the equipment is energized. This, of course, can result in over-voltage conditions within the electronic equipment creating a hazard of possible damage to the components of the electronic equipment.

Another solution has been to design the power supply such that modifications in the power supply circuitry can be made to accommodate other input voltages. Obviously, however, this is a rather time consuming expedient especially in the case of portable equipment that is easily carried from one place to another.

Accordingly, it is an object of the present invention to provide a new and improved power supply for supplying a predetermined output voltage notwithstanding its connection to input voltage sources of different magnitudes.

It is also an object of the present invention to provide a power supply which operates in a multiplicity of modes to accommodate different magnitudes of input a.c. source voltages.

It is a more specific object of the invention to provide a power supply which operates in a multiplicity of modes to automatically accommodate a.c. input voltage sources of different magnitudes.

Summary of the Invention

The present invention provides an a.c. to d.c. voltage power supply which supplies a predetermined output voltage notwithstanding its connection to a.c. external voltage sources of first or second voltage magnitudes comprising a.c. voltage transforming means having input terminals for connection to an external a.c. voltage source for transforming the external a.c. voltage applied to its terminals. A rectifying means coupled across the transforming means operates in either a first or second operating mode to accommodate the first or second a.c. source voltages for providing a pulsating d.c. voltage and has output terminals for connection to an external load. A monitoring means for sensing the first or second voltage magnitude of the external a.c. voltage applied to the input terminals provides a mode control voltage in response to the first or second magnitude of the external a.c. voltage. Switching means, coupled to the rectifying means and the monitoring means are provided for switching the rectifying means into the first or second operating mode in response to the mode control voltage developed by the monitoring means.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings, and in the several figures of which like reference numerals indicate identical elements and in which:

Figure 1:
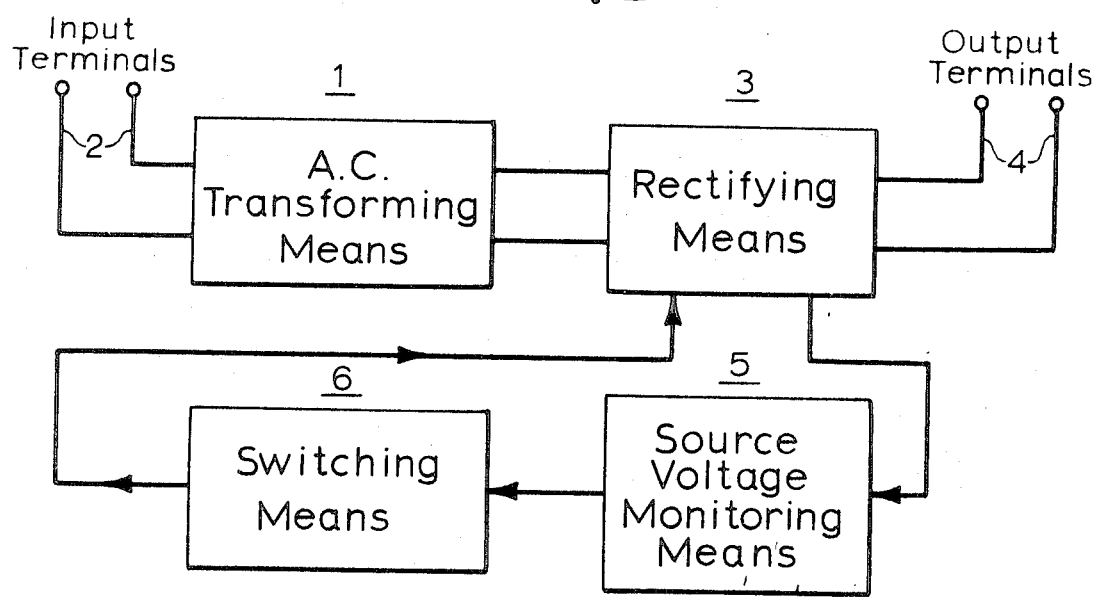
FIG. 1 is a block diagram of an a.c. to d.c. power supply system embodying the present invention.

The novel power supply of the present invention and how it provides a predetermined d.c. output voltage notwithstanding its connection to external a.c. voltage sources of first or second voltage magnitudes may be best understood by first referring to the block diagram of FIG. 1. An a.c. transforming means 1 has input terminals 2 adapted for connection to an external a.c. voltage source. It transforms the a.c. source voltage applied to its terminals to an a.c. voltage of a desired amplitude. A rectifying means 3 is coupled across the a.c. transforming means and provides a pulsating d.c. voltage at its output terminals 4, which are adapted for connection to an external load. The rectifying means 3 operates in either a first or second mode of operation to accommodate the first or second a.c. source voltages applied to terminals 2. A monitoring means 5 coupled to the rectifying means senses the first or second a.c. source voltage magnitude applied to the supply by monitoring the voltage across rectifying means 3. It provides a mode control voltage in response to the first or second magnitude of the external a.c. voltage. A switching means 6 is coupled between monitoring means 5 and rectifying means 3 and switches the rectifying means into the first or second operating mode in response to the mode-control voltage developed by the monitoring means.

Figure 2:
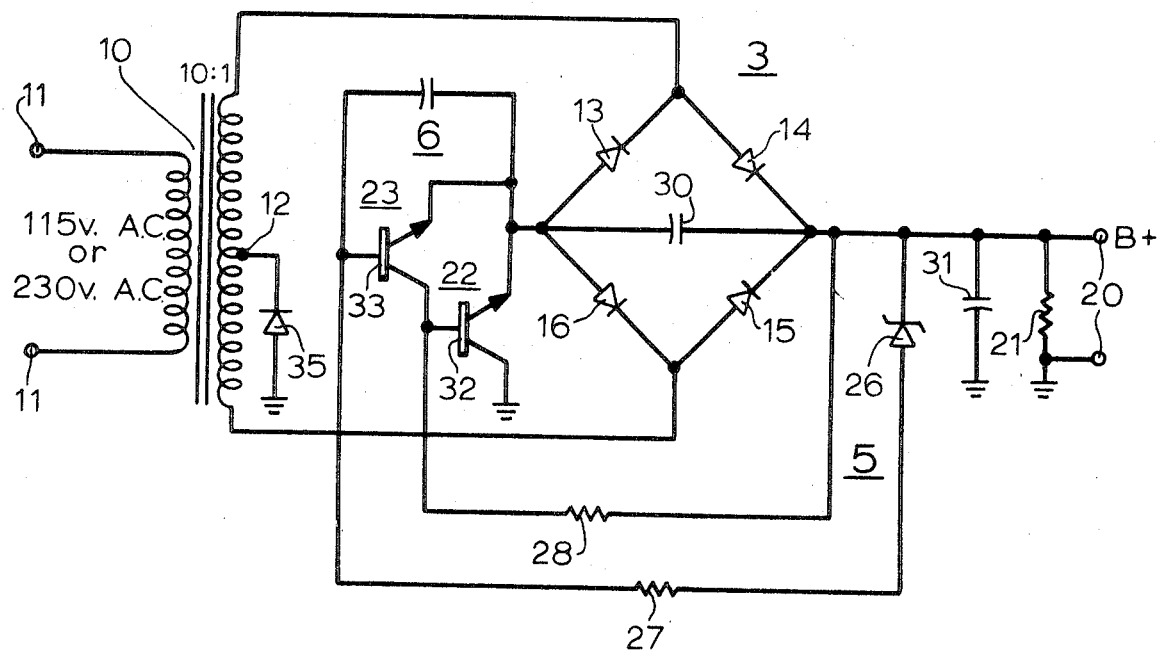
FIG. 2 is a schematic circuit diagram of a preferred embodiment of the invention.

A schematic circuit diagram of a power supply embodying the present invention is shown in FIG. 2. It provides a predetermined d.c. output voltage of 12 volts even though external a.c. voltage sources of a first or second magnitude such as, for example, 115 volts a.c. or 230 volts a.c., are applied to its input terminals.

The power supply of FIG. 2 has an a.c. transformer 10 having input terminals 11 for connection to an external a.c. source. The transformer has a center tapped secondary and is wound to have a primary-to-secondary turns ratio of approximately 10:1. An a.c. source voltage applied to its terminals will be transformed in accordance with this turns ratio. For example, a 115 a.c. source voltage will be transformed to an a.c. voltage having a magnitude of approximately 12 volts across the secondary of transformer 10. An a.c. source voltage of 230 volts will be transformed to an a.c. voltage of 12 volts on either side of center tap 12 resulting in a 24-volt a.c. voltage across the entire secondary of transformer 10.

The rectifying means 3 of the power supply comprises diodes 13, 14, 15 and 16 which are connected in a diode bridge configuration across the secondary of transformer 10. The junction of diodes 14 and 15 comprises the output of the rectifier, which has output terminals 20 for connection to an external load represented by load resistor 21. The rectifier operates in either a diode bridge rectifying mode to accommodate an a.c. input source of 115 volts or a full-wave rectifying mode to accommodate a 230-volt input source.

Switching means 6, comprising transistors 22 and 23 coupled to the junction of diodes 13 and 16, switch the rectifier into the proper rectifying mode. When the rectifier operates in the diode bridge rectifying mode, transistor 22 is saturated, effectively connecting the junction of diodes 13 and 16 to a reference potential such as ground. In this mode, diodes 13, 14, 15 and 16 operate as a diode bridge. When the rectifier operates in the full-wave rectifying mode, transistor 22 is cut off and transistor 23 is saturated, raising the junction of diodes 13 and 16 above the reference potential and effectively disconnecting these diodes from the circuit. Diodes 14 and 15 still remain operative and comprise the full-wave rectifier.

Monitoring means 5, coupled to rectifying means 3 and switching means 6, sense the magnitude of the a.c. input source by monitoring the voltage across the diode bridge and provide a mode control voltage to the base 33 of transistor 23 in response thereto. It comprises the series connection of zener diode 26 and resistor 27. Zener diode 26 has a threshold voltage value slightly above the value of the desired output power supply voltage; for this preferred embodiment the zener threshold is approximately 15 volts. The mode control voltage is approximately equal to the voltage across the diode bridge minus the combined voltage drops of the zener threshold voltage and the voltage across resistor 27.

In operation, the input terminals 11 of a.c. transformer 10 are connected to an external a.c. voltage source of 115 volts. The resulting 12-volt a.c. voltage across the secondary of the transformer is rectified by diodes 13, 14, 15 and 16 to provide a pulsating d.c. voltage of 12 volts which is filtered by capacitors 30 and 31. The voltage at output terminal 20 being coupled to the base 32 of transistor 22 by resistor 28 forward biases transistor 22. Transistor 22 saturates and is allowed to remain saturated because the mode control voltage at base 33 of transistor 23 is insufficient to cause transistor 23 to be forward biased. Transistor 22 thus connects the junction of diodes 13 and 16 to ground to render the rectifier in a diode bridge rectifying mode. For each half cycle of the a.c. input voltage the 12 volts across the secondary of transformer 10 will be applied to the output terminal 20 of the rectifier.

For an a.c. source voltage of 230 volts, the rectifier operates in the diode bridge rectifying mode until the voltage across the diode bridge exceeds the threshold voltage of Zener diode 26. When this happens diode 26 conducts, providing a mode control voltage to base 33 sufficient to saturate transistor 23. Because the base 32 of transistor 22 is connected to the collector of transistor 23, it cuts off when transistor 23 saturates. The junction of diodes 13 and 16 will no longer be connected to ground, effectively removing diodes 13 and 16 from the operation of the power supply. At this time the rectifier 3 operates in the full-wave rectifying mode with diodes 14 and 15 doing the rectifying. When the rectifier is switched by switching means 6 into the full wave rectifying mode, diode 35 which is coupled between center tap 12 and a reference ground potential completes the common return circuit for the full-wave rectifier.

As previously described, for an input voltage of 230 volts a.c. the transformer 10 has a secondary voltage of 12 volts on either side of center tap 12. During each half cycle of the a.c. rectifying period this 12 volts is applied to the output of the supply by either diode 14 or 15.

The rectifier 3 of the power supply illustrated in FIG. 2 therefore operates in either a diode bridge operating mode for an input voltage of 115 volts a.c., or in a full-wave rectifying mode for an input voltage of 230 volts a.c., providing in each case a d.c. output voltage of 12 volts. The mode selection is accomplished automatically, precluding the possibility of supplying too great a voltage to the electronic circuitry to which it is connected.

The circuit of the invention is economical to construct, requiring only a minimum number of additional components over those required in a conventional single-voltage supply. In any case, voltage changes are automatic, no circuit modifications being necessary to the circuit of the invention to accommodate either the 115-volt a.c. or 230-volt a.c. input source voltages.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

I claim:

1. An a.c. to d.c. voltage power supply which supplies a predetermined output voltage notwithstanding its connection to a.c. external voltage sources of first or second voltages of substantially different magnitudes by operating in either one of two distinct operating modes comprising:

an a.c. voltage center tapped transformer having input terminals for connection to an external a.c. voltage source for transforming the external a.c. voltage applied to its terminals;

rectifying means coupled across said transformer which operate in either a full-wave bridge or full-wave center tap operating mode to accommodate said first or second a.c. source voltages for providing a pulsating d.c. voltage and having output terminals for connection to an external load;

monitoring means for sensing the first or second voltage magnitude of said external a.c. voltage applied to said input terminals and for providing a mode control voltage in response to said first or second magnitude of said external a.c. voltage;

and switching means coupled to said rectifying means and to said monitoring means for switching said rectifying means into said full-wave bridge or full-wave center tap operating mode in response to said mode control voltage developed by said monitoring means.

2. An a.c. to d.c. voltage power supply in accordance with claim 1 wherein said a.c. voltage center tapped transformer has a diode coupled between the center tap and a reference potential.

3. An a.c. to d.c. voltage power supply in accordance with claim 1 where said first voltage source magnitude is substantially less than said second voltage source magnitude and where said rectifying means operates in said full-wave bridge rectifying mode to accommodate said first a.c. source voltage.

4. An a.c. to d.c. voltage power supply in accordance with claim 1 where said second voltage source magnitude is substantially greater than said first voltage source magnitude and where said rectifying means operates in said full-wave center tap rectifying mode to accommodate said second a.c. source voltage.

5. An a.c. to d.c. voltage power supply in accordance with claim 1 wherein said switching means comprise a first and second transistor, said mode control voltage being applied to said first transistor, and where said second transistor is saturated to establish said rectifying means in said full-wave bridge operating mode and where said first transistor is saturated by said mode control voltage to cut off said second transistor to establish said rectifying means in said full-wave center tap operating mode.

6. An a.c. to d.c. voltage power supply in accordance with claim 1 where said monitoring means comprise a zener diode.

7. An a.c. to d.c. power supply comprising:

a center tapped source of a.c. voltage;

rectifying means coupled across said source comprising four diodes in a diode bridge configuration, which operate in either a full-wave bridge or full-wave center tap operating mode to accommodate source voltages of substantially different magnitudes and which has output terminals for connection to an external load;

means for monitoring said source voltage coupled to said rectifying means and for providing a mode control voltage in response to said source voltage magnitude;

and switching means comprising a first and second transistor coupled to said rectifying means, said first transistor being coupled to said monitoring means for receiving said mode control voltage for controlling the switching action of said switching means in response to said mode control voltage to switch said rectifying means into either said full-wave bridge or said full-wave center tap operating mode.

* * * * *